Figure 1:
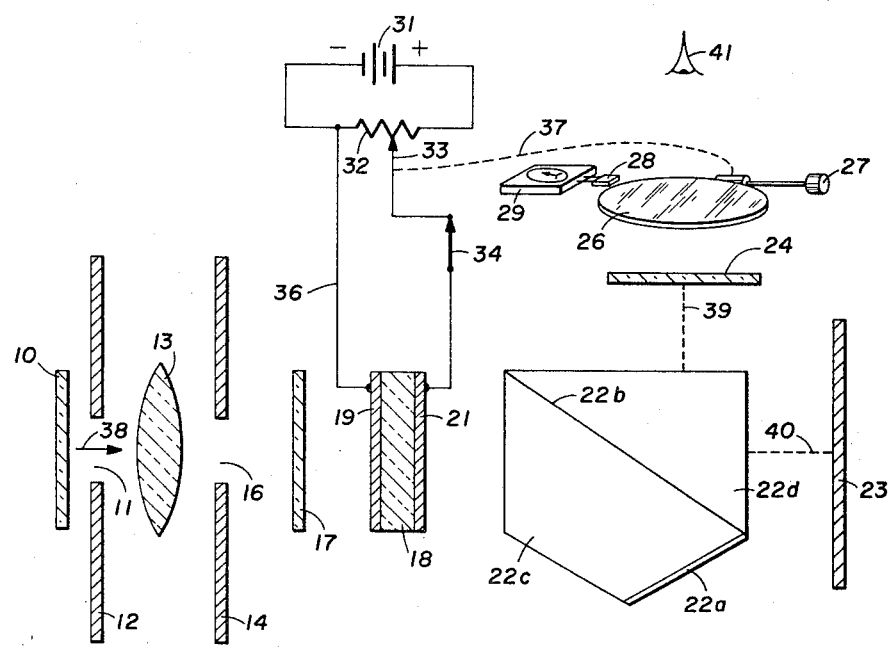

March 18, 1969  W. J. BEYEN ET AL  3,433,139
ELECTRO-OPTIC CONTROLS FOR REFLEX CAMERAS
Filed Oct. 19, 1966

INVENTOR
WERNER J. BEYEN
HENRY J. CAULFIELD

ATTORNEY

United States Patent Office 3,433,139
Patented Mar. 18, 1969

3,433,139
ELECTRO-OPTIC CONTROLS FOR REFLEX CAMERAS
Werner J. Beyen and Henry J. Caulfield, Richardson, Tex., assignors to Texas Instruments Incorporated, Dallas, Tex., a corporation of Delaware
Filed Oct. 19, 1966, Ser. No. 587,846
U.S. Cl. 95—10                    8 Claims
Int. Cl. G01j 1/52

This invention relates to camera controls, and more particularly to electro-optic controls for reflex cameras.

Means of regulating the path and intensity of light in reflex cameras previously employed have been largely mechanical. It has been necessary to control the time and intensity of the camera film's exposure to entering light by means of a precisely timed mechanical shutter and an aperture of precisely adjustable diameter. Such mechanisms employ moving parts which are subject to frictional wear. Moreover, it is difficult to achieve the precision of movement required to obtain pictures of high quality in such systems.

In one aspect of the present invention, a reflex camera is provided with electro-optic means for controlling the intensity of light incident on the camera film.

Another aspect of the invention is that the function of the mechanical shutter of a reflex camera is accomplished electro-optically.

A further aspect is the provision of an electro-mechanical coupling responsive to light information at the viewfinder of a reflex camera for adjustment of the intensity of light exposure.

In accordance with the present invention, light entering a reflex camera passes through a conventional camera lens, then through a polarizer, an electro-optic body, and a beam splitting prism. The opposite faces of the electro-optic body are connected to a continuously variable voltage source.

Light travels through the prism along either of two paths, depending on the polarization state of the light. The polarization state of the light entering the prism is determined by the voltage applied to the electro-optic body.

The system is oriented so that all of the light emerging from the electro-optic body when no voltage is applied thereto will follow a path through the prism which leads to a viewfinder screen. A voltage applied to the electro-optic body will cause some of the light to follow another path through the prism to a photographic film. The amount of light diverted to the film is dependent upon the magnitude of the voltage applied.

The magnitude of the voltage, and thus the intensity of light exposing the film, may be set automatically. In one aspect, a light sensing device is positioned to receive light from the viewfinder screen through a rotatable polarizer. The polarizer is rotated until the light sensing device indicates the desired amount of light. The polarizer rotation is linked as to adjust the magnitude of the voltage source. Thereafter, when such voltage is applied to the electro-optic body the desired amount of light exposes the film.

In accordance with a further aspect of the invention, a timed mechanical shutter to control exposure time is eliminated by providing a voltage to be applied to the electro-optic body in pulse form of precisely controllable duration.

Figure 2:
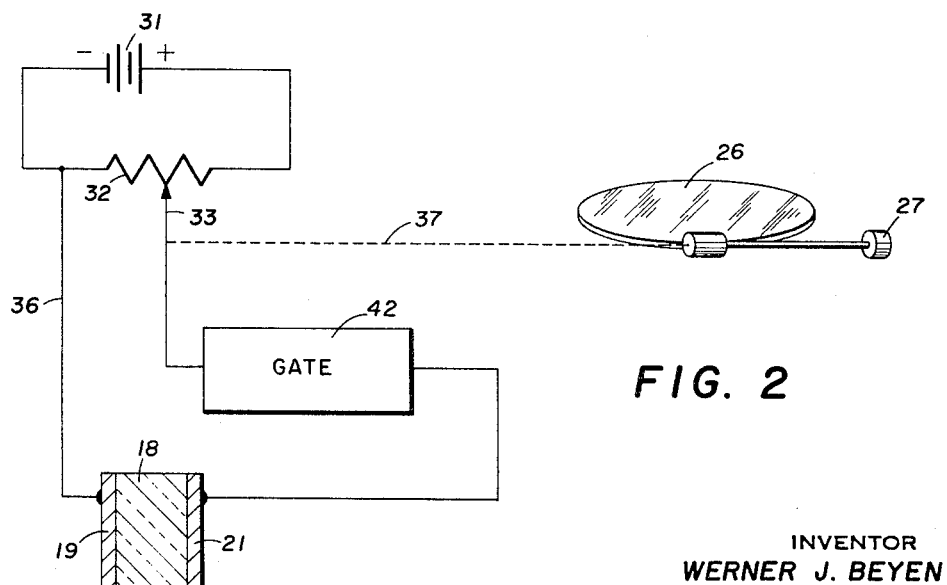

For a more complete understanding of the present invention and for further objects and advantages thereof, reference may now be had to the following description taken in conjunction with the accompanying drawings in which:

FIGURE 1 is a schematic drawing of a system embodying the present invention; and FIGURE 2 is a schematic drawing of controls in a modified embodiment of the present invention.

In the system of FIGURE 1 a shutter 10 is positioned in the light path leading to a camera adjacent to a fixed aperture 11 in a baffle 12. Lens 13 is positioned between baffle 12 and baffle 14 which also has a fixed aperture 16. A polarizer 17 and an electro-optic body 18 having transparent electrodes 19 and 21 on opposite faces of the body 18 are positioned successively along the light path. A beam splitting prism 22, having a silvered surface 22a and a common interface 22b between elements 22c and 22d is placed in the light path emerging from body 18. A film plane 23 is positioned at the focal point of the lens 13. A viewing screen 24 and a polarizer 26 are positioned along a secondary light path leading from the beam splitter 22. A control knob 27 is provided for manual rotation of the polarizer 26. A photocell 28 is positioned to sense the amount of light on screen 24 and indicator 29 is connected to cell 28.

A voltage source 31 is connected in series with a potentiometer 32. The variable tap 33 of the potentiometer 32 is connected by way of switch 34 to electrode 21. The negative terminal of battery 31 is connected to electrode 19 by way of conductor 36. Tap 33 is connected to the polarizer 26 by linkage 37.

Light enters the camera through aperture 11 in the direction indicated by arrow 38 when shutter 10 is open and passes through lens 13, aperture 16, polarizer 17, electro-optic body 18, and beam splitting prism 22.

Shutter 10 will be opened during initial adjustment of the camera. When the film 23 is to be exposed, the shutter 10 will be operated conventionally, opening for only the desired exposure time.

The position of lens 13 is adjusted to achieve the desired focus of light entering the camera in accordance with well-known procedure.

The electrodes 19 and 21 may be thin films of tin oxide and may be continuously supplied with a voltage which is varied over the range represented by source 31.

The body 18 may be composed of any of the electro-optic materials, such as KTN (potassium tantalate-niobate) or KDP (potassium dihydrogen phosphate). When a voltage is applied to such a material, the polarization state of light traversing the material is rotated. The amount of rotation depends on the magnitude of the voltage. The electro-optic body 18 is controlled for cooperation with prism 22 to cause the desired amount of light to be diverted onto film 23.

The prism 22 is one known in the art as a Foster-Seeley prism. The action of such a prism on light passing therethrough causes a deviation of 90° between the emerging ordinary and extraordinary beams of polarized light. Thus, the intensity of the beams emerging from prism 22 can be regulated by controlling the polarization state of light entering the prism 22. It is to be understood that other beam-splitting devices could be used in combination with other optical elements to obtain the desired deviation between the two polarized beams.

The prism 22 is oriented so that one of the light paths emerging therefrom, indicated by its axis 39, leads to the view finder screen 32. The other light path indicated by its axis 40 leads to film 34.

The screen 24 is viewed by operator 41 through polarizer 26. Photocell 28 with indicator 29 receives light from screen 24 through polarizer 26. The angle of rotation of polarizer 26 controls the adjustment of potentiometer 32 by way of linkage 37.

In the initial adjustment of the camera, shutter 10 and switch 34 remain open. Light from the subject to be photographed enters aperture 11 and passes through lens 13 and aperture 16 before striking polarizer 17. The plane polarized light emerging from polarizer 17 enters body 18. With no voltage on body 18 the polarization state of the light is unaffected by body 18.

The plane polarized light travels from body 18 to prism 22. The polarizer 17 is oriented so that light passing through it has a plane of polarization such that the light is deflected 90° by the prism 22. Such deflection is achieved by alignment of the axis of polarizer 17 with the preferred axis of polarization of the light path represented by its axis 38. Thus all of the light entering the camera during initial adjustment is directed, because of the combined action of polarizer 17 and prism 22, to the screen 24.

The image of the subject to be photographed shown on screen 24 may then be employed in the well known techniques of framing and focusing. The image is also important in the automatic adjustment of the camera for intensity of light exposure.

Light from screen 24 passes through rotatable polarizer 26 and strikes the photocell 28. The polarizer 26 is rotated using knob 27 until the desired light intensity reading is shown by indicator 29.

The linkage 37 of the polarizer 26 and the potentiometer tap resistance 33 is such that the magnitude of the voltage across electrodes 19 and 21 when switch 34 is closed depends upon the angle of rotation of the polarizer 26. This dependence is calibrated so that the action of body 18 when switch 34 is closed causes the proper amount of light to expose film 23.

It will be understood that the adjustment of the intensity of light exposure may be accomplished with conventional techniques employing independent light meters or the operator's own judgment. The operator may set the polarizer 26, and thus the potentiometer tap 33, using such techniques.

When initial adjustment is completed, shutter 10 is closed. Switch 34 is then closed, thus applying a voltage across electrodes 19 and 21. Shutter 10 is then opened and the action of body 18 upon light entering therethrough causes the proper amount of light to be directed along the path 39 from prism 22 to expose film 23. The shutter 10 closes automatically at the end of the desired exposure time.

In the system of FIGURE 2, the need for a precisely timed mechanical shutter 10 is eliminated and its function performed electro-optically. The same basic system is employed in FIGURE 2, as in FIGURE 1, with the substitution of a precision time gate 42 for switch 34 of FIGURE 1.

The gate 42 normally serves as switch between source 31 and electrodes 19 and 21. When gate 42 is activated, it closes the circuit for a variably short length of time and then automatically returns to its normally open condition.

Thus the need for shutter 10 to control exposure time is eliminated. The shutter 10 remains open during the entire operation, though it may still be closed to prevent light leaks when the camera is not in use.

Light entering the camera is directed to the viewfinder until gate 42 is closed, causing a voltage drop across electrodes 19 and 21. Light is incident on the camera film while gate 42 is closed. When gate 42 returns to its open condition, all of the light entering the camera once again travels to the viewfinder.

Having described the invention in connection with certain specific embodiments thereof, it is to be understood that further modifications may now suggest themselves to those skilled in the art and it is intended to cover such modifications as fall within the scope of the appended claims.

What is claimed is:

1. Means for adjusting the proportions of a light beam to travel along two paths comprising:
    (a) a polarizer, an electro-optic body and a beam splitter located successively along the incident path of said beam,
    (b) a light sensitive element for producing an indication of light traveling along a first of said paths leading from said splitter,
    (c) means for adjusting a voltage for application to said electro-optic body in dependence upon the amount of light striking said light sensitive element, and
    (d) means for applying the adjusted voltage to said body to shift light emerging from said splitter from said first of said paths to the second of said paths with an intensity dependent upon said voltage.

2. In a camera having a lens for focusing objects at a focal plane to be occupied by film, the combination which comprises:
    (a) a polarizer, an electro-optic body and a beam splitter located successively along the ordinary light path leading from said lens to said focal plane,
    (b) a light sensitive element for producing an indication of light traveling along a second path from said splitter,
    (c) means for adjusting a voltage for application to said electro-optic body in dependence upon the amount of light striking said light sensitive element, and
    (d) means for passing light along the ordinary path from said splitter for a predetermined time interval at an intensity dependent upon said voltage.

3. In a camera having a lens for focusing light at a plane occupied by film, the combination which comprises:
    (a) a polarizer, an electro-optic body and a beam splitter optically interposed between said lens and said film, said beam splitter oriented so that a first polarized light path emerging therefrom leads to said film, said polarizer having its axis aligned with the preferred axis of polarization of a second polarized light path emerging from said beam splitter, and
    (b) means for applying to said electro-optic body a voltage of selectable magnitude within a predetermined range to control the amount of light to follow said first path.

4. The combination set forth in claim 3, wherein said first path and said second path are mutually perpendicular.

5. The combination set forth in claim 3 wherein said beam splitter is a Foster-Seeley prism.

6. The combination set forth in claim 3, further comprising a light sensitive element placed in said second path, and means for varying the magnitude of said voltage in dependence on the amount of light striking said element.

7. The combination set forth in claim 6, wherein said means for varying the magnitude of said voltage in dependence on the amount of light striking said element comprises:

(a) a rotatable polarizer interposed in said second light path between said beam splitter and said element, and
(b) means for making the magnitude of said voltage depend upon the angle of rotation of said rotatable polarizer.

8. The combination set forth in claim 6, which includes means for applying said voltage to said body for a preselected time interval.

References Cited

UNITED STATES PATENTS 2,190,729  2/1940  Nerwin.
2,825,271  3/1958  McKae.
3,007,388  11/1961  Ogata et al. _____ 95—53
3,030,852  4/1962  Courtney-Pratt ____ 95—53 XR
3,302,028  1/1967  Sterzer.

NORTON ANSHER, Primary Examiner.

J. F. PETERS, JR., Assistant Examiner.

U.S. Cl. X.R.

95—53; 350—150, 157; 250—225; 343—100, 768, 786, 854